Oct. 15, 1963 R. W. KING 3,106,745
APPARATUS FOR PRODUCING PLASTIC CONTAINERS
Filed Aug. 4, 1961 2 Sheets-Sheet 1
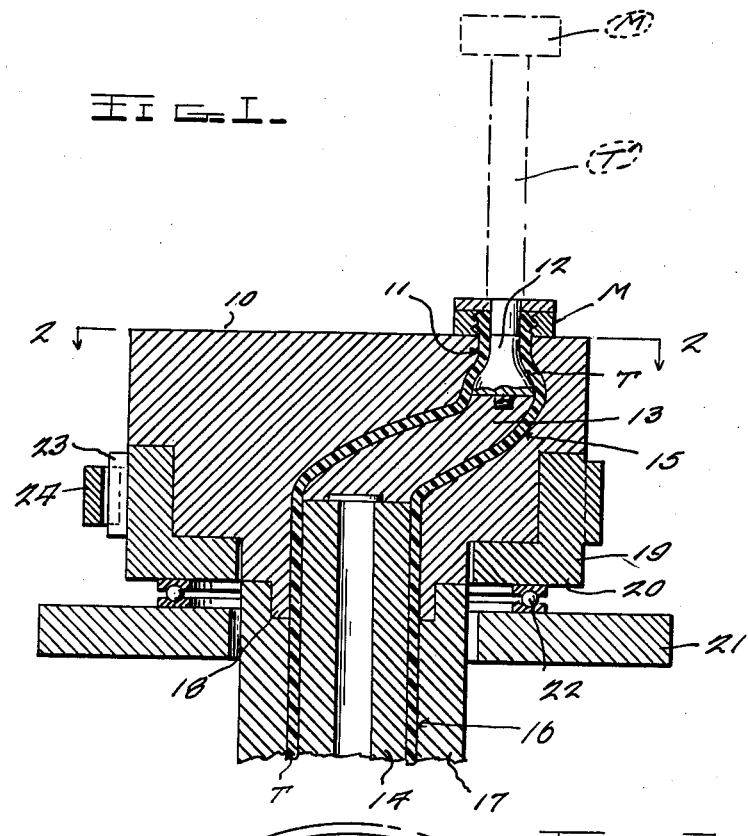
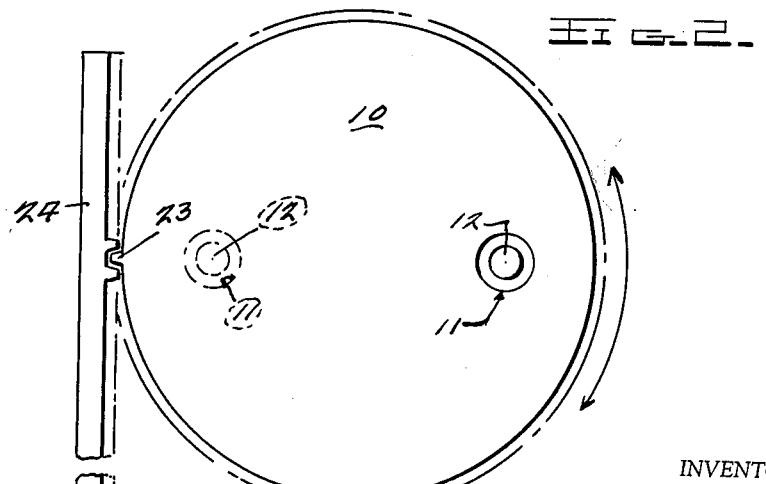
INVENTOR.
R W KING
BY W.G. Schaich
and Spencer L. Blaylock jr
ATTORNEYS

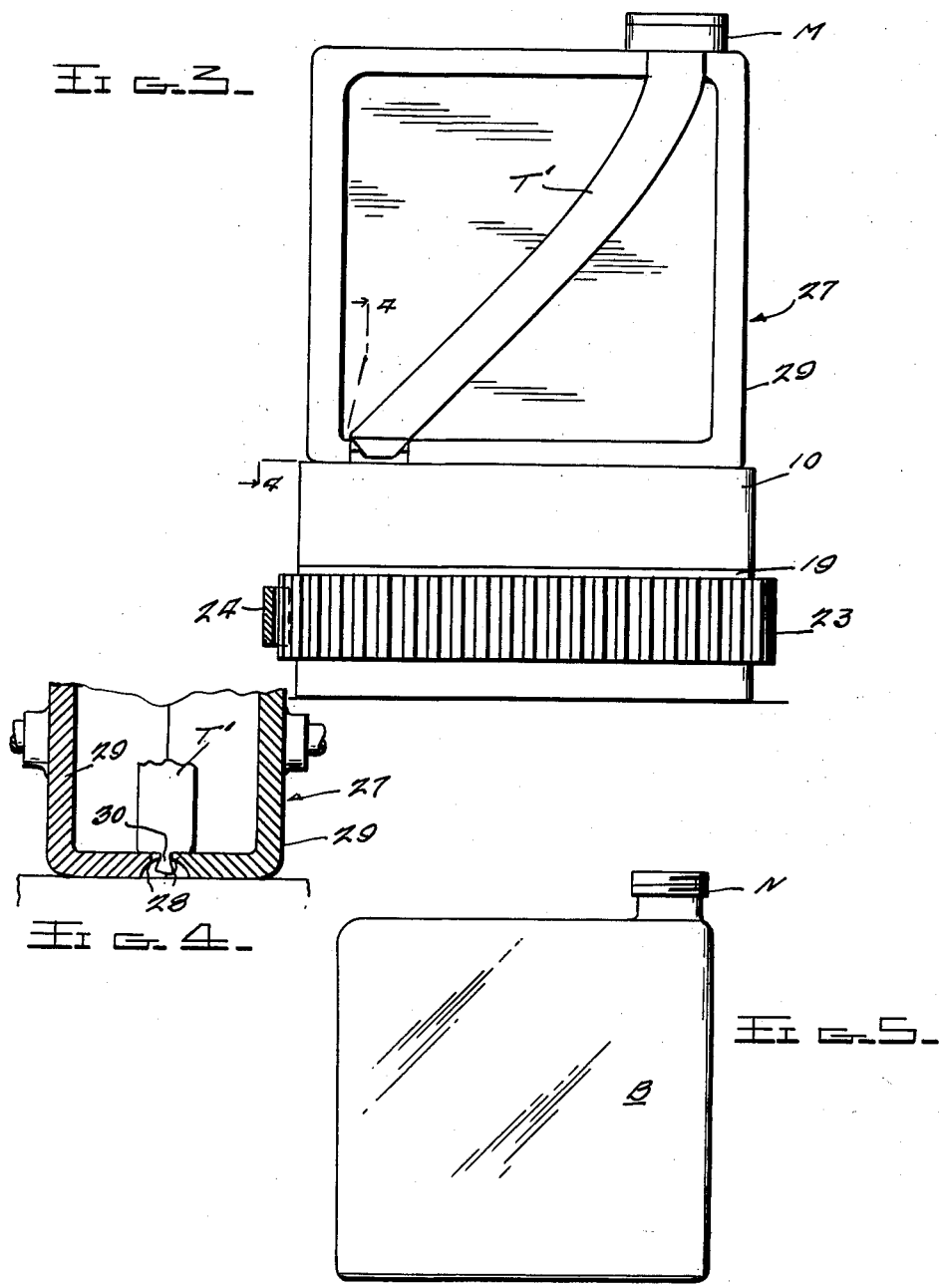

3,106,745
APPARATUS FOR PRODUCING PLASTIC CONTAINERS
Robert W. King, Winthrop, Mass., assignor to Owens-Illinois Glass Company, a corporation of Ohio
Filed Aug. 4, 1961, Ser. No. 129,443
1 Claim. (Cl. 18—5)

This invention relates generally to an apparatus for producing plastic containers and more particularly to an apparatus for manufacturing blown plastic containers, wherein the neck portion is offset axially relative to the body.

An important object of my invention is the provision of a simple, yet effective, apparatus, through the utilization of which bottles with axially offset necks may be produced rapidly and with walls which are relatively free from thin or excessively thick areas.

A further object of this invention is the provision of an apparatus for producing blown plastic containers having substantially uniform wall thickness.

A further object of my invention is the provision of a novel and simple form of rotatable orifice bushing and carrier therefor.

These and other objects of this invention will become apparent from a reading of the following detailed description taken in conjunction with the accompanying drawings in which:

FIGURE 1 is a vertical sectional view with parts in elevation showing the rotatable orifice bushing, its holder, etc. and a neck mold in two of its operating positions.

FIGURE 2 is a plan view taken along the plane of line 2—2 of FIGURE 1.

FIGURE 3 is a side elevational view of the orifice bushing and holder and the blow mold, with one half removed.

FIGURE 4 is a fragmentary sectional view taken substantially along the plane of line 4—4 of FIGURE 3.

FIGURE 5 is a side elevational view of an offset-neck type of bottle with the production of which my invention is primarily concerned.

In brief this invention contemplates positioning an elongated hollow thermoplastic tube, or parison, in a blow mold so that all segments of the tube travel about the same distance incident to expansion against the mold cavity walls. Thus no isolated zone is subjected to a materially greater or lesser degree of stretching than another, and of necessity the resultant article is relatively free from thin and thick spots, etc. As a consequence, stronger, more uniform bottles are produced.

This invention also contemplates apparatus to accomplish the above results in which the orifice bushing of the extruder is movable laterally as by rotation, to shift its position following extrusion of a length of tube to position the latter inclined just prior to closing of a blow mold about the tube.

In the illustrated embodiment of my invention it comprises an orifice bushing 10 provided near one margin with an annular orifice 11, such being defined at its inner wall by a mandrel 12. The mandrel 12 is separably connected at its base to a core member 13 which at its lower end is rotatively connected to the upper end of a stationary vertical sleeve or tube 14. The core 13 is positioned in a passageway 15 which extends upwardly and generally radially outward from the upper end of the stationary tube 14. Between the wall of this passageway 15 and the core thermoplastic material T such as polyethylene flows in tubular form to the orifice 11 from an annular channel 16, the latter defined by the aforementioned stationary tube 14 and a housing 17. The upper end of the housing 17 and a reduced neck-like extension 18 on the base of the orifice bushing provide a rotary connection between these two elements, permitting independent bodily rotation of the bushing, as will be apparent presently. It will be noted that the axis of the orifice 11 and axis of the tube 14 about which the bushing moves are parallel and offset relative to each other. The extent of such offset may vary, as dictated by the specific character of the bottles being manufactured.

A rotatable holder 19 for the orifice bushing may be of cup-like form to accommodate the bushing 10. This holder, as shown, has a flange-like base 20 between which and a frame 21 are ball bearings 22. A ring gear 23 encircles the holder and may mesh with a rack 24 which is reciprocated by a piston-type air motor 25, for the purpose of moving the orifice 11 from one operating position to another. Obviously, other mechanisms may well be utilized to so move the orifice bushing.

Above the orifice bushing 10 is a conventional neck mold M which is movable vertically by conventional well known means (not shown) so that in its lowermost position it contacts the bushing in register with the orifice 11. In this position the molding material is injected into the neck mold, thus immediately and finally shaping the neck N of the bottle B. This also anchors the neck to the mold. With upward movement of the neck mold and concurrent extrusion of polyethylene from the orifice, a tube or parison is produced, such at this stage extending in a vertical direction. As is customary, upward travel of the neck mold M is terminated at a predetermined point preparatory to closing of a blow mold 27 about the tube or parison.

Before the blow mold closes, however, the orifice bushing is rotated about its axis 180°, thereby shifting the orifice 11 from the full line position of FIGURE 2 to the dotted line position therein shown. Such movement places the tube or parison as in FIGURE 3, with its axis inclined and its lower end pinched between meeting knife edges 28 of the blow mold halves 29. The upper, neck carrying end, at this stage, is anchored in the neck mold which contacts the upper side of the blow mold 27.

Upon closing of the blow mold and resultant sealing of the bottom end of tube T or parison, air under pressure may be introduced through the neck to expand the tube to the final shape of the bottle being produced. With removal of the blown bottle from the mold, the flash or tail 30 is removed from the bottom.

The blown bottle B is thus provided with a neck portion which is offset axially relative to the body portion. In addition, the wall thickness of the bottle B is substantially uniform as a result of the substantially equal travel of all segments of the tube T incident to expansion.

It will be apparent from the foregoing that various modifications may be made in this invention without departing from the spirit and scope of the following claim.

I claim:
In apparatus for producing a bottle having a body and an axially offset neck, a rotatable movable orifice bushing, a mandrel associated with the bushing to provide an annular orifice through which a thermoplastic tube may be extruded, a neck mold positionable in register with the annular orifice and movable axially away from the latter with a length of tube anchored to both the orifice bushing and neck mold, means for imparting rotary movement to the orifice bushing and with it the adjacent end of the tube whereby to position the latter with a major portion of its axis inclined to the neck mold axis, and a blow mold closable about the tube.

References Cited in the file of this patent

UNITED STATES PATENTS

| | | |
|---|---|---|
| 2,858,564 | Sherman et al. | Nov. 4, 1958 |
| 2,936,481 | Wilkalis et al. | May 17, 1960 |
| 3,000,051 | Schaich | Sept. 19, 1961 |
| 3,014,243 | Hehl | Dec. 26, 1961 |

FOREIGN PATENTS

| | | |
|---|---|---|
| 1,169,230 | France | Dec. 24, 1958 |